July 6, 1948.    M. F. SKINKER ET AL    2,444,473
METHOD OF MAKING RECTIFIERS
Filed Oct. 26, 1943    2 Sheets-Sheet 1
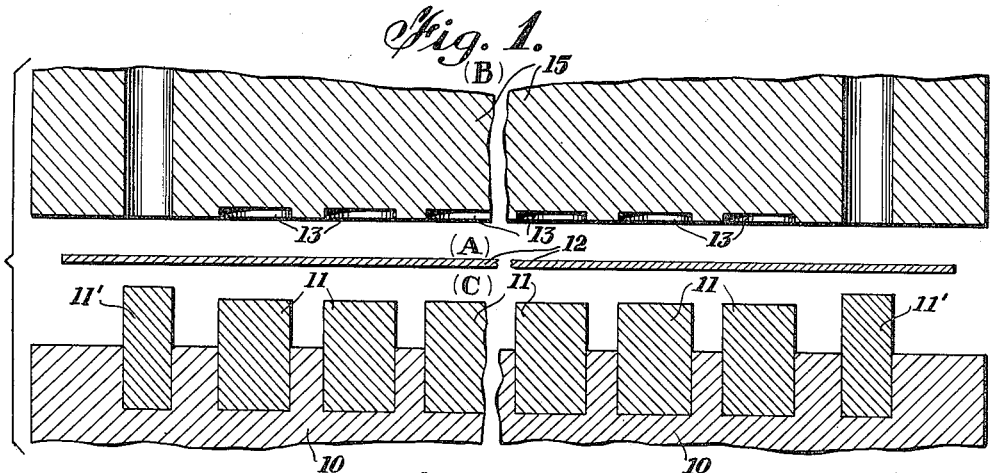
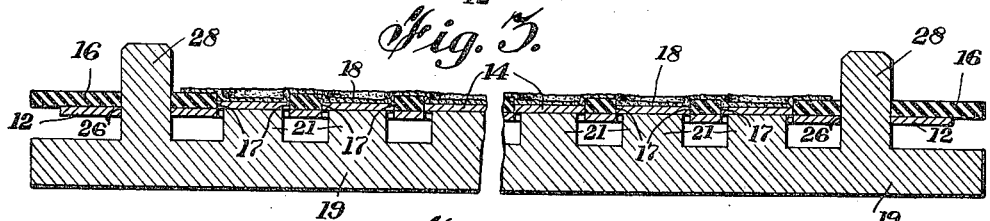
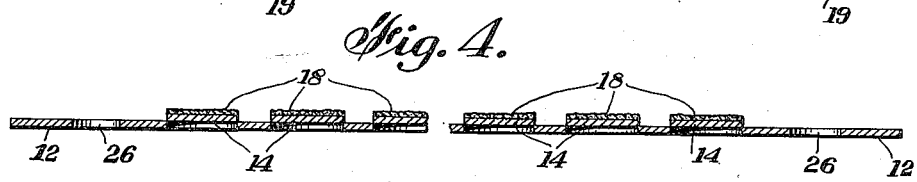
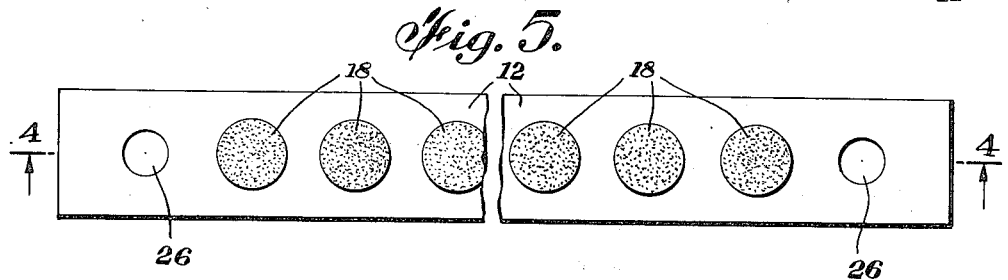
INVENTORS
MURRAY F. SKINKER
LESLIE B. HAIGH
RALPH O. HALL
BY
ATTORNEY July 6, 1948.    M. F. SKINKER ET AL    2,444,473
METHOD OF MAKING RECTIFIERS
Filed Oct. 26, 1943    2 Sheets-Sheet 2

INVENTORS
MURRAY F. SKINKER
LESLIE B. HAIGH
RALPH O. HALL
BY
ATTORNEY

Patented July 6, 1948

2,444,473

UNITED STATES PATENT OFFICE 2,444,473

METHOD OF MAKING RECTIFIERS

Murray F. Skinker, Montclair, Leslie B. Haigh, West Orange, and Ralph O. Hall, East Orange, N. J., assignors to Federal Telephone and Radio Corporation, New York, N. Y., a corporation of Delaware Application October 26, 1943, Serial No. 507,670

14 Claims. (Cl. 175—366)

This invention relates to improvements in methods of making rectifiers, and more particularly to the mass production of dry contact rectifiers such as selenium rectifiers.

An object of this invention is the mass production of small rectifiers.

Another object of this invention is to improve known methods of making small rectifiers.

A more specific object of this invention is to provide a method whereby a plurality of rectifier buttons such as selenium covered buttons may be simultaneously cut out from a metal base plate, and covered with suitable selenium, insulating and counter-electrode alloy layers so as to simultaneously form a plurality of rectifier buttons, each complete in itself.

These and other features, capabilities and advantages of the invention will appear from the subjoined detail description of one specific embodiment thereof, illustrated in the accompanying drawings in which:

Fig. 1 is a cross sectional view illustrating a portion of a punch press together with a metal plate or strip from which the rectifier buttons are punched;

Fig. 2 is a cross sectional view showing the metal rectifier buttons partially punched out from the metal plate by the press;

Fig. 3 is a cross-sectional view of the partially punched-out plate positioned in a fixture for applying the selenium coating;

Fig. 4 is a cross-sectional view of the partially punched-out plate with selenium-coated buttons, taken along the line 4—4 of Fig. 5;

Fig. 5 is a top plan view of the metal plate showing the partially punched-out buttons covered with selenium;

Figure 6:
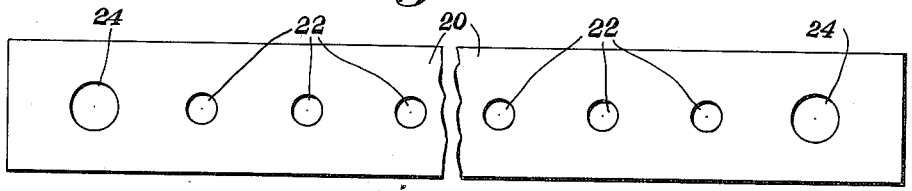
Fig. 6 is a top plan view of a masking sheath to be applied over the partially punched-out buttons.

It is already known to form dry contact rectifiers, such as selenium rectifiers, by utilizing a plurality of extremely small buttons mounted in contact with one another within an insulating tube. Such an arrangement is shown, for example, in the copending application of Fiore and Kotterman, S. N. 460,600, filed October 3, 1942, now Patent No. 2,423,091. Each button consists of a complete rectifier in itself with a selenium-coated base plate covered, in turn, with an insulating layer and a counter-electrode alloy, and in order to manufacture these buttons economically, it is obvious that, if possible, mass production methods be used.

According to the present invention we propose to simultaneously punch out a plurality of such buttons from a suitable base plate, illustrated in Fig. 1 (A). This figure shows a portion of a punch press 10 having suitable raised punches 11 adapted to punch buttons out of the metal plate 12 against the dies 13 in the upper section of the press 15. In accordance with the present invention the depth of the dies 13 is such that as is more clearly illustrated in Fig. 2, these buttons indicated at 14 are not wholly punched out of the original metal plate but, during the first stage of the method are only partially punched out. At the same time, the punches 11' form aligning openings 26 at opposite ends of the plate.

After this partial punching operation the metal plate 12 is placed in a supporting fixture 19 (Fig. 3), having fingers 28 in the aligning openings 26, and provided with raised seats 21 under the buttons 14. On top of the plate 12 is placed a mask 16 having a plurality of openings 17 which fit over the buttons 14. Selenium, preferably in the form of powder is then sprinkled over the mask, covering the buttons 14 in the form of a layer 18. The mask 16 is then removed, carrying with it any selenium powder except that sprinkled on the buttons themselves. It will thus be seen that by this step no selenium powder is wasted as the excess may be removed from the mask for reuse. With the selenium powder on the metal buttons 14 and while these are still supported from below by the fixture 19, the selenium is pressed and heat treated to form the desired rectifying layer. The plate 12 with its partially punched-out buttons covered by selenium layer 18 will then have the appearance substantially as shown in Figs. 4 and 5.

Figure 7:
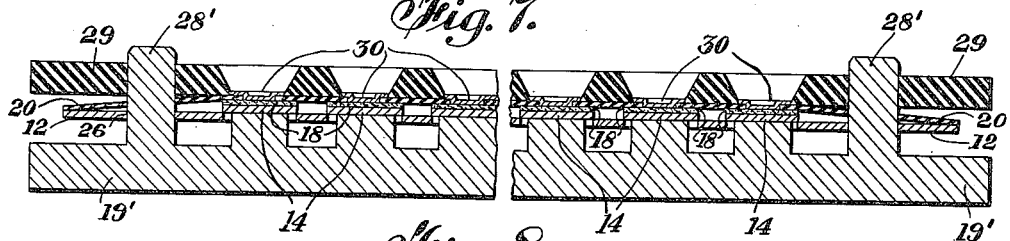
Fig. 7 is a cross-sectional view of the selenium-coated masked, punched-out plate in the jig for applying counter-electrode alloy.
Figure 8:
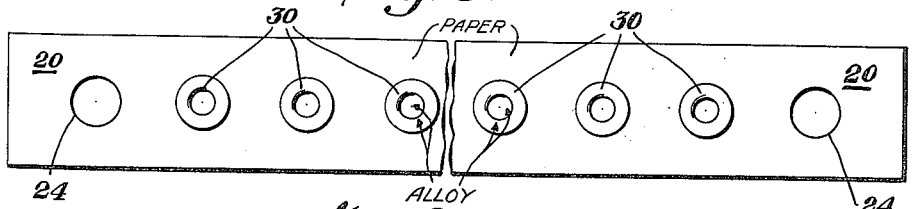
Fig. 8 is a top plan view of the punched-out plate with insulating mask and counter-electrode alloy applied.

The assembly is next covered with a mask 20 (Fig. 6) which may be formed, for example, of insulating paper having a plurality of spaced openings 22 so arranged as to preferably align with the individual partially punched-out buttons. In order to assure proper alignment, the mask 20 may be formed with templet holes 24 which are aligned with the similar holes 26 in the metal plate 12. The partially punched-out plate 12 with the mask 20 are placed on the same or a similar fixture 19', and alignment is maintained through the holes 24 and 26 by any suitable means as fingers 28'. As more clearly shown in Fig. 7, the mask 20 is then covered with a second mask 29 having somewhat larger openings than the openings 22, through which counter-electrode alloy 30 may be applied as by spraying. The counter-electrode alloy not only covers a portion of the mask 20 but also penetrates through the openings 22 therein to the selenium layer 18, and the plate will then have the general appearance as shown in Fig. 8.

Figure 9:
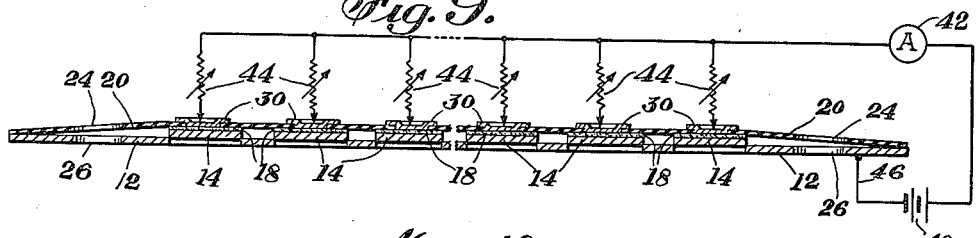
Fig. 9 is a cross-sectional view of the plate showing a circuit diagram of a preferred gang electroforming process.
Figure 10:
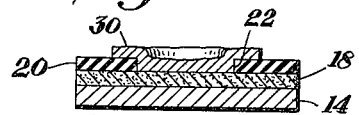
Fig. 10 is a vertical cross-sectional view of an individual completed rectifier button, drawn on a larger scale.

The individual rectifier units may then be electroformed together by any suitable means such as the common circuit shown in Fig. 9. A source of power 40 is connected through the ammeter 42 through individual controllable resistors 44 to each counter-electrode alloy spot, while the circuit is completed from the other side of the source of power to the metal plate 12 as through conductor 46. After electroforming, the buttons 14 may now be easily knocked out from the original metal plate 12 and the extraneous portions of the insulating mask 20 removed in any suitable manner, leaving a plurality of individual rectifier units more clearly illustrated on a larger scale in Fig. 10. It will be seen that each unit is complete in itself consisting of a metallic base plate 14, a selenium layer 18 and a counter-electrode alloy layer 30 penetrating through the insulating layer 20 to have a small contact area with the selenium. The small contact area between the counter-electrode alloy and the selenium provides increased efficiency of each rectifier unit due to the higher current density present, and this construction is particularly suitable for small rectifiers of low current-carrying capacity. Attention is also directed to the fact that if the counter-electrode layer is carefully applied, the center of its surface will curve somewhat inwardly as shown in Fig. 10, so that when contacting pressure is applied to this upper surface such pressure will not be exerted upon the operating layer between the counter-electrode alloy and the selenium.

Figure 11:
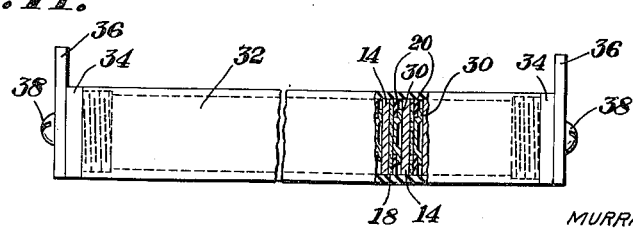
Fig. 11 illustrates, by way of example, the manner in which the individual rectifier buttons may be assembled to form a complete rectifier unit.

Each rectifier unit constructed in the manner described above is accordingly formed with two opposite contacting surfaces, formed on the one hand by the button 14 and on the other hand by the upper surface of the counter-electrode alloy 30. A plurality of such buttons may be assembled in an insulating tube to form a complete built-up rectifier unit of the type described in the aforementioned Fiore and Kotterman application and illustrated by way of example in Fig. 11. While the details of the rectifier tube construction form no part of the present invention, it may be stated briefly that this may consist of a hollow insulating tube 32 internally threaded at opposite ends to receive an externally threaded end bushing 34 whose lower end will press against one of the contacting surfaces of the end rectifying unit. In Fig. 11, the insulating tube has been illustrated as partially broken away to show the individual rectifier units in end-to-end relationship, a plurality of these units thereby being connected in series to form the completed rectifier. The end bushings 34 may also be formed with a solid internally threaded portion receiving a holding screw 38 for attached contacting lugs 36. It will also be understood by those skilled in this art that if two sets of serially connected rectifier buttons are placed within an insulating tube with adjoining like faces at the center to which a contacting lug is connected, this center contact together with the interconnected outer lugs may be used as a full-wave rectifier. This arrangement is also more specifically disclosed in the aforementioned Fiore and Kotterman application which also describes further details of the insulating tubes by means of which a plurality of these tubes may be serially connected.

Variations in the above-described method, coming within the scope of the instant invention are contemplated and will be more or less obvious to those skilled in this art. For example, it is not absolutely necessary to a complete realization of the present invention to use the removable mask 16, since the upper surface of the partially punched-out buttons could be sprinkled or otherwise covered with selenium without the use of the mask, and the fact that excess selenium might spill on the unused portion of the metal would not adversely affect the construction of the individual rectifier units. However, the use of the mask 16, as pointed out above, assists in preventing waste of the selenium. The material from which the insulating mask 20 is formed may be varied, for example, it could be a thin sheet of synthetic resinous material as well as insulating paper. Additionally, it is contemplated that the insulating mask could have those portions thereof corresponding to and fitting over the raised selenium-covered buttons partially pre-punched out to assist in removing the completed button after the counter-electrode alloy has been applied. It will, of course, be understood that where necessary, the steps of etching and fuming may be included in the usual manner. Accordingly, while we have described above the principles of our invention in connection with specific apparatus, a specific device and the particular method of making the same, it is to be clearly understood that this description is made only by way of example and not as a limitation on the scope of our invention as set forth in the objects and the accompanying claims.

We claim:

1. The method of making rectifiers, which includes the steps of punching a plurality of buttons partially out of a sheet of metal plate, applying a layer of rectifying material to the top of each button, pressing and heat treating the rectifying material, placing a mask of insulating material over the partially punched-out buttons, said mask having a plurality of openings therethrough smaller than and coinciding with each partially punched-out button, applying a counter-electrode alloy over said mask and through said openings to contact the rectifying material on the buttons, and then removing the button-shaped rectifiers from their original metal plate and said mask of insulating material in such a way as to leave a marginal ring of this material on the rectifying coating.

2. The method according to claim 1, in which said rectifying material is selenium.

3. The method according to claim 1, which includes the further step of masking the original metal sheet when the rectifying material is being applied to the partially punched-out buttons, and removing the mask before the insulating mask and counter-electrode alloy are applied.

4. The method of making rectifiers, which includes the steps of punching a plurality of buttons partially out of a metal strip, locating said partially punched-out strip in position on a plurality of spaced raised button supports under each partially punched-out button, applying a layer of rectifying material on the upper surface of each button, heat treating the rectifying material, covering the top of said strip with a mask of insulating material having spaced openings exposing a portion of the top of each button, applying a counter-electrode alloy over said mask and through said openings to contact the rectifying material on the buttons, and then removing the button-shaped rectifiers from the metal strip and said mask in such a way as to leave a marginal ring of insulating material on the rectifying coating of each button.

5. The method according to claim 4, in which said rectifying material is selenium.

6. The method according to claim 4, which includes the further step of masking the original metal sheet when the rectifying material is being applied to the partially punched-out buttons, and removing the mask before the insulating mask and counter-electrode alloy are applied.

7. The method according to claim 4, which includes the step of simultaneously electroforming the individual assembled rectifier buttons before they are removed from the common strip.

8. The method according to claim 4, which includes the steps of punching an aligning hole at each end of the metal strip, and in which said fixture is provided with spaced upstanding fingers positioning said metal strip through said aligning holes.

9. The method according to claim 4, which includes the further steps of masking the insulating mask with a second mask having openings larger than those in the insulating mask, prior to the application of the counter-electrode alloy, whereby the final area of counter-electrode alloy on the top of each button is limited, and removing this mask before the individual buttons are punched out.

10. The method of making rectifier elements, which comprises the steps of partially punching out a plurality of buttons from a metal plate, applying a layer of rectifier material to one surface of each button, heat-treating the rectifier layer, applying a counter-electrode to the heat-treated layer and then removing the buttons from the plate.

11. The method according to claim 10, in which the counter-electrode is applied to each heat-treated layer by spraying through a mask.

12. The method according to claim 10, in which the rectifier layer is applied to the raised surface of each button.

13. The method according to claim 10, which includes the further step of interposing an insulating mask having an opening therethrough smaller than the area of the covered surface of each button, between the rectifying layer of each button and the applied counter-electrode, whereby the counter-electrode contacts the rectifying material only through such opening.

14. The method of making rectifiers, which includes the steps of simultaneously punching a plurality of longitudinally spaced buttons partially out of a metal strip, positioning the said strip for performance of further operations thereon, covering the strip with a mask having openings corresponding with the said partially punched-out buttons, applying a layer of rectifying material on the top of each button, pressing and heat treating the rectifying material, replacing the said mask by a mask of insulating material having spaced openings exposing a portion of the top of each button, placing on the said second mask a third mask having openings which are larger than those of the second mask, applying a counter-electrode alloy over said masks and through said openings to contact the rectifying material on the buttons, removing the third mask, and then removing the button-shaped rectifiers from the metal strip and said second mask in such a way as to leave a marginal ring of insulating material on the rectifying coating of each button.

MURRAY F. SKINKER.
LESLIE B. HAIGH.
RALPH O. HALL.

REFERENCES CITED

The following references are of record in the file of this patent:

UNITED STATES PATENTS

| Number | Name | Date |
| --- | --- | --- |
| 2,137,831 | Brunke | Nov. 22, 1938 |
| 2,235,051 | Thompson | Mar. 18, 1941 |
| 2,244,664 | Addink et al. | June 10, 1941 |
| 2,261,725 | Hoppe | Nov. 4, 1941 |
| 2,359,377 | Miller | Oct. 3, 1944 |
| 2,379,919 | Miller | July 10, 1945 |
| 2,392,744 | Kallmeyer | Jan. 8, 1946 |